United States Patent [19]

Meiring et al.

[11] Patent Number: 5,486,103
[45] Date of Patent: Jan. 23, 1996

[54] BLOW MOLD CLAMP ASSEMBLY

[75] Inventors: David P. Meiring, Troy; Lynn R. Maggert, Arcanum, both of Ohio

[73] Assignee: Electra Form, Inc., Vandalia, Ohio

[21] Appl. No.: 239,501

[22] Filed: May 9, 1994

[51] Int. Cl.$^6$ .................................................. B29C 49/00
[52] U.S. Cl. ...................................... 425/541; 425/451.9
[58] Field of Search ............................... 425/538, 541, 425/595, 451.3, 451.9, DIG. 221, 450.1, 451; 264/532

[56] References Cited

U.S. PATENT DOCUMENTS

| | | | |
|---|---|---|---|
| 3,782,879 | 1/1974 | Mnilk et al. | 425/450 |
| 3,829,264 | 8/1974 | Mnilk et al. | 425/149 |
| 3,924,987 | 12/1975 | Mehnert | 425/451.5 |
| 3,969,057 | 7/1976 | Pierre | 425/242 R |
| 4,248,582 | 2/1981 | Martin, Jr. | 425/451.3 X |
| 4,260,358 | 4/1981 | Mehnert | 425/541 X |
| 4,437,825 | 3/1984 | Harry et al. | 425/541 X |
| 4,484,884 | 11/1984 | Wiatt et al. | 425/534 |
| 4,626,190 | 12/1986 | Hellmer | 425/541 X |
| 4,645,447 | 2/1987 | Sumitomo | 425/450.1 |
| 4,762,486 | 8/1988 | Windstrup et al. | 425/541 |
| 4,822,275 | 4/1989 | Voss et al. | 425/539 |
| 4,834,642 | 5/1989 | Voss et al. | 425/529 |
| 4,959,191 | 9/1990 | Yoshioka et al. | 425/541 X |
| 5,044,925 | 9/1991 | Watanabe | 425/542 |
| 5,064,366 | 11/1991 | Voss | 425/541 |
| 5,253,995 | 10/1993 | Romstad et al. | 425/522 |
| 5,306,564 | 4/1994 | Guzikowski | 425/450.1 X |

*Primary Examiner*—Robert J. Warden
*Assistant Examiner*—Krisanne M. Thornton
*Attorney, Agent, or Firm*—Locke Reynolds

[57] ABSTRACT

A blow mold assembly has a first and second carriage, and air cylinders for moving the first and second carriages along guide rods between an open position and a closed position. A first and second mold half are coupled respectively to the first and second carriages to define in the closed position at least one blow mold cavity. A lock situated on confronting surfaces of the first and second carriages locks the carriages together when the carriages are located in the closed position. The lock includes a pair of channel defining members coupled to one of the carriages having opposed edges including a series of teeth separated by interdental spaces, and a corresponding pair of cooperating toothed members coupled to another of the carriages and arranged to penetrate the interdental spaces. Each first mold half is movably mounted to the first carriage and is biased away from the second mold half. A chamber is situated between the first carriage and the first mold half having an opening for introducing fluid into said chamber in sufficient amount and under sufficient pressure to overcome the biasing forces and to resist any pressure applied to the first blow mold half during blow molding of an article within the blow mold cavity insuring faithful continuous mating of the two mold halves defining each blow mold cavity.

18 Claims, 6 Drawing Sheets

BLOW MOLD CLAMP ASSEMBLY

BACKGROUND OF THE INVENTION

The present invention is directed to apparatus for blow molding plastics and in particular to an assembly including a blow mold and associated apparatus for opening and closing the mold during the operation thereof. The present invention has utility in both reheat blow molding of containers, as well as in a linear injection stretch blow molding machine for producing containers using a one-step process.

In both the one-step and two-step processes for manufacturing stretch blow molded plastic bottles, a parison is introduced between two halves of a blow mold at a temperature conducive for orientation of the polymer constituting the preform. The mold halves are subsequently brought together and maintained in that relationship with sufficient force to resist any tendency of the mold halves to separate under the pressure directed to the interior of the preform during the blow molding process. This clamping pressure is often achieved by means of toggle links or other clamp mechanisms such as that shown in FIGS. 9–11 of U.S. Pat. No. 4,484,884. In such a system, the mating halves of the mold pair are held together under a compressive force of the toggle links which counteract the blowing pressure within the blow molds. The compressive force of the toggle links is supplied through the tie bars in a known manner. Such apparatus has the disadvantage of being very bulky and therefore requiring significant amounts of energy to operate the machine through the blowing cycle.

It has been recognized that a somewhat faster operation can be achieved through rotary blow molding and that extensive clamping forces are not necessarily required if a self-locking scheme is employed for the blow mold. Examples of such self-locking schemes are shown in U.S. Pat. Nos. 4,834,642 and 5,064,366. Such rotary blow molding molds incorporating such self-locking features are generally of lower weight for the same volume container and therefore are capable of being operated in a more efficient manner. However, each mold is individually operated and there has not been any significant attempts to adapt the lighter weight self-locking features of such rotary molds into the multiple cavity reciprocal molds typified by U.S. Pat. No. 4,484,884.

SUMMARY OF THE INVENTION

In accordance with the present invention, a blow mold clamp assembly comprises at least one set of confronting carriages, each carriage set comprising a first carriage and a second carriage. Means are provided for moving the first and second carriages linearly between an open position and a closed position along guide means which guide the movement of the confronting carriages. Each confronting carriage set has at least a first and a second mold half coupled to each of the first and second carriages, respectively, for movement with the carriages to define in the closed position at least one blow mold cavity for each set of carriages. Locking means are situated on confronting surfaces of each of the first and second carriages on both sides of the mold halves for locking the carriages together when the carriages are located in the closed position. The number of mold cavities between each pair of locking means can vary with the size of the molds.

The blow mold assembly can further comprise a third carriage carrying at least one bottom mold further defining each blow mold cavity with each third carriage reciprocating orthogonally with respect to the path of movement of the associated set of first and second carriages. The third carriage can be trapped between the mold halves on the first and second carriages in the closed position. Each third carriage can include means for actuating the locking means to lock the first and second carriages together at the closed position.

The locking means preferably comprises at least one channel defining member coupled to one of the first and second carriages of each set, the channel defining member having opposed edges including a series of teeth separated by interdental spaces. The confronting carriage has at least one cooperating toothed member coupled to a confronting surface of the other carriage, the series of teeth being arranged to penetrate the interdental spaces. The operation of the third carriage can cause movement of the toothed member from a position aligned with said interdental spaces to a position engaging the teeth forming the interdental spaces to lock the carriages together. Alternatively, the locking means can be actuated by a separate actuating means such as an air cylinder.

In another feature of the present invention, the blow mold assembly further comprises mounting means for movably mounting each first half mold to its associated first carriage including biasing means for biasing the first mold half away from the second mold half. A chamber is situated between each first carriage and the associated first mold halves. Means are provided for introducing a fluid such as compressed air into said chamber in a sufficient amount and under sufficient pressure to overcome the biasing means and to resist any pressure applied to the first blow mold half during the blow molding of an article within the blow mold cavity.

The locking means provided on the confronting surfaces of the blow mold carriages allows for the elimination of heavy toggle clamps or similar mechanisms for clamping blow molds together. The elimination of such bulky equipment permits speedier operation of multiple cavity molding equipment which can simultaneously blow mold a significant supply of bottles in a short time.

The biasing feature of the present invention, coupled with the self-locking feature, enables enhanced pressure to be applied to the molding halves during the blow molding operation thereby insuring faithful continuous molding of the two mold halves of each mold cavity and thereby diminish any artifact created by movement of the mold halves under the pressure of the molding operation.

These and other features and advantages will become apparent to those skilled in the art upon consideration of the following description of an apparatus setting forth the best mode of the invention as presently perceived. The description makes reference to the accompanying drawings.

DESCRIPTION OF THE PREFERRED EMBODIMENT

Figure 1:
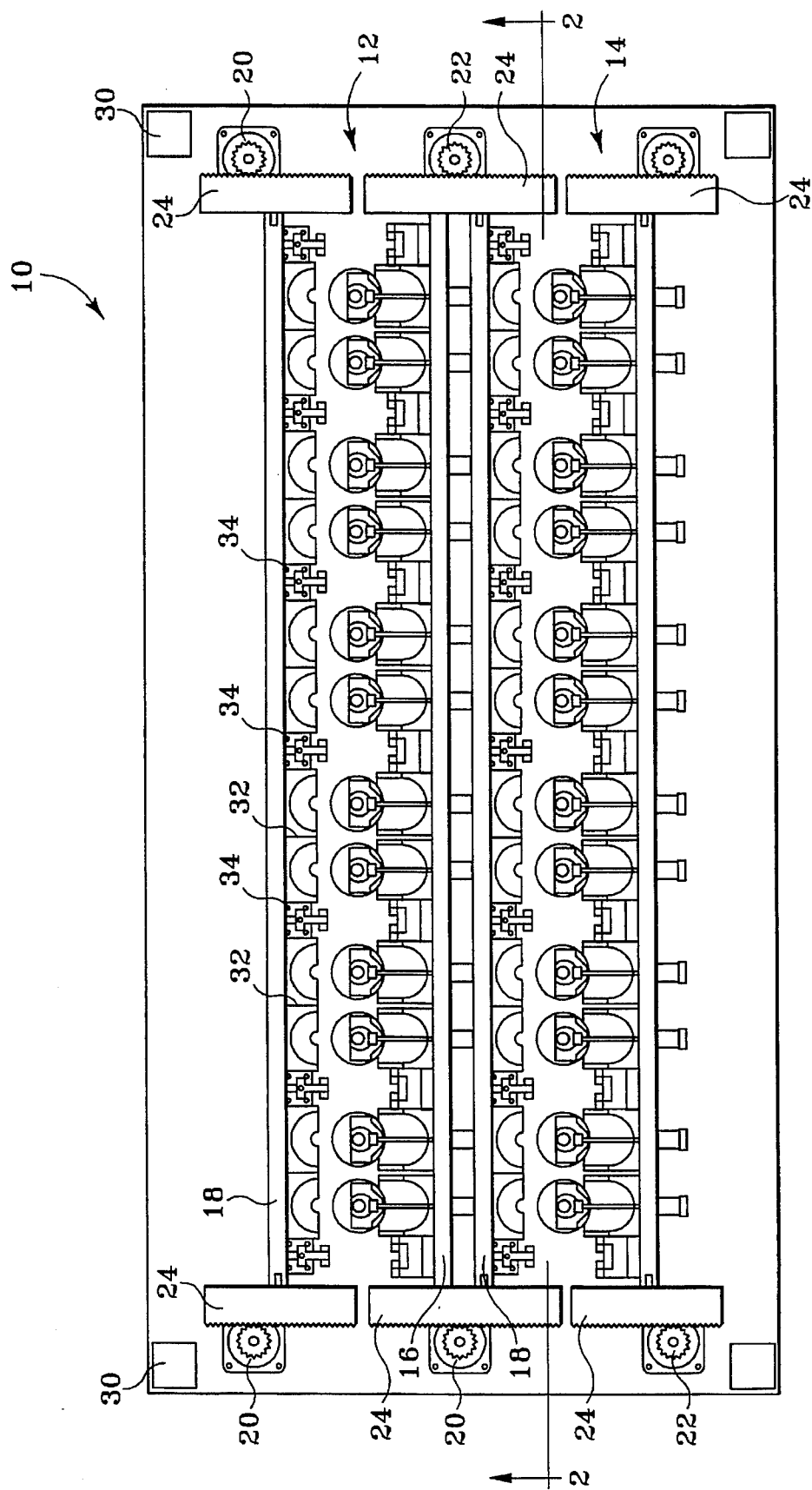
FIG. 1 is a plan view of a two row, 24 cavity blow molding machine incorporating a blow mold clamp assembly in accordance with the present invention, the assembly being shown in the open position.
Figure 3:
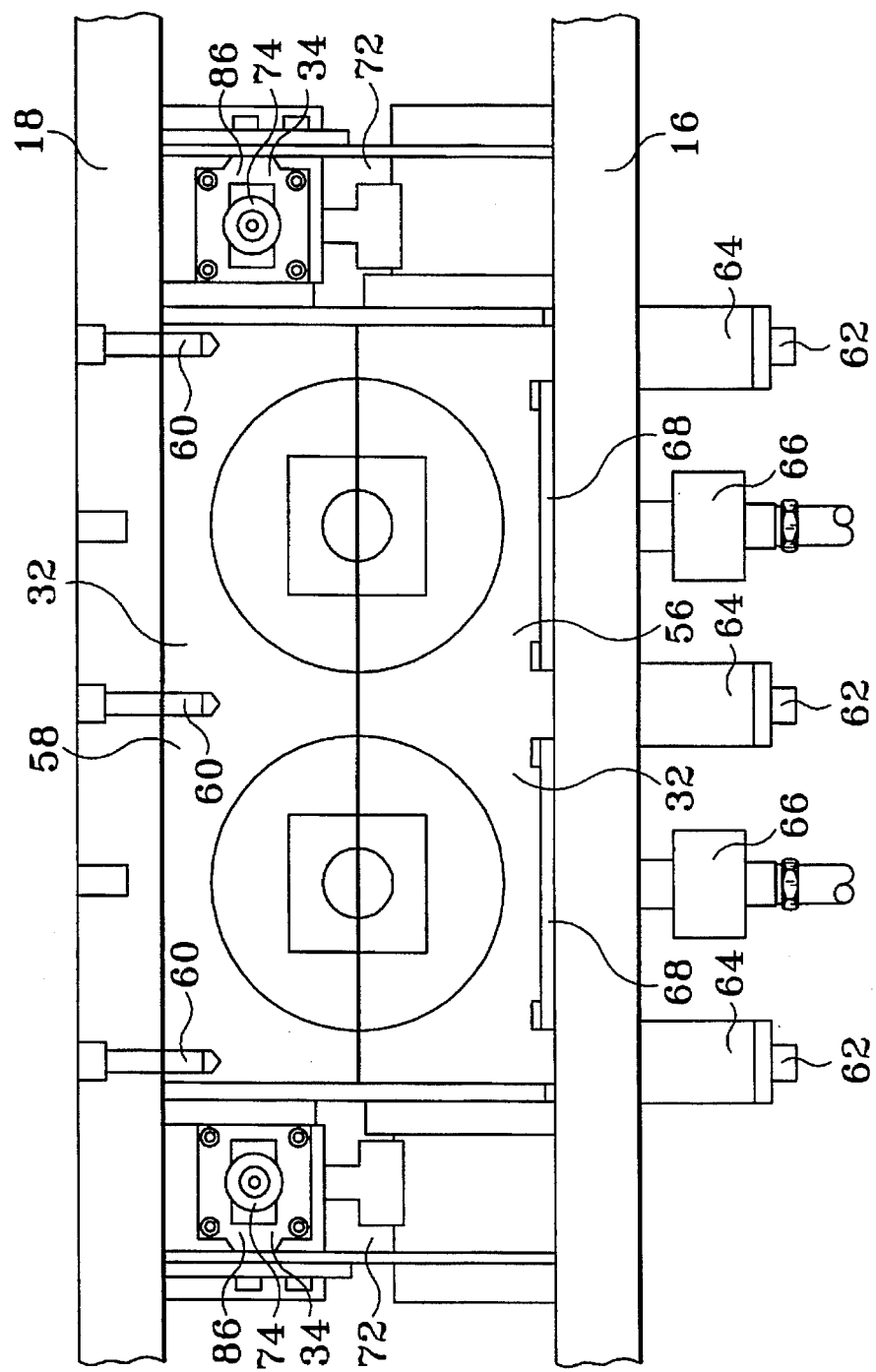
FIG. 3 is a plan detail view of a single mold pair taken from FIG. 1 with the clamp assembly shown in the closed position.

A blow molding machine 10 incorporating blow mold clamp assemblies in accordance with the present invention is shown in a plan view in FIG. 1 to have two rows 12 and 14 of blow molds, each row containing twelve confronting pairs of mold halves defining cavities in which bottles can be molded. Each row of molds 12 and 14 includes a first carriage 16 and a second carriage 18. A motive means 20 in the form of a servo-drive is coupled to a pinion gear 22. Each pinion gear engages a rack 24 fixed to the ends of the carriages 16 and 18. By applying appropriate power to the servo-motors 20, the racks and attached carriages can move between the open position illustrated in FIG. 1 and a closed position where the confronting pairs of molds close to define cavities as shown in FIG. 3. It will be appreciated that the racks attached to the ends of the first carriages 16 should generally be positioned at a different height from those attached to the second carriage 18 so that when the carriages 16 and 18 are moved to the closed position, the approaching racks 24 do not interfere with each other. It will also be appreciated that other motive means such as air cylinders or hydraulic cylinders could be employed in place of the illustrated rack and pillion arrangement. It will be seen in FIG. 1 that each line of molds 12 and 14 consists of six sets 32, each set 32 comprising two mold halves containing one or more cavities, and each mold set 32 being separated from adjacent mold sets by locking means 34, shown in detail in FIGS. 3–8.

Figure 2:
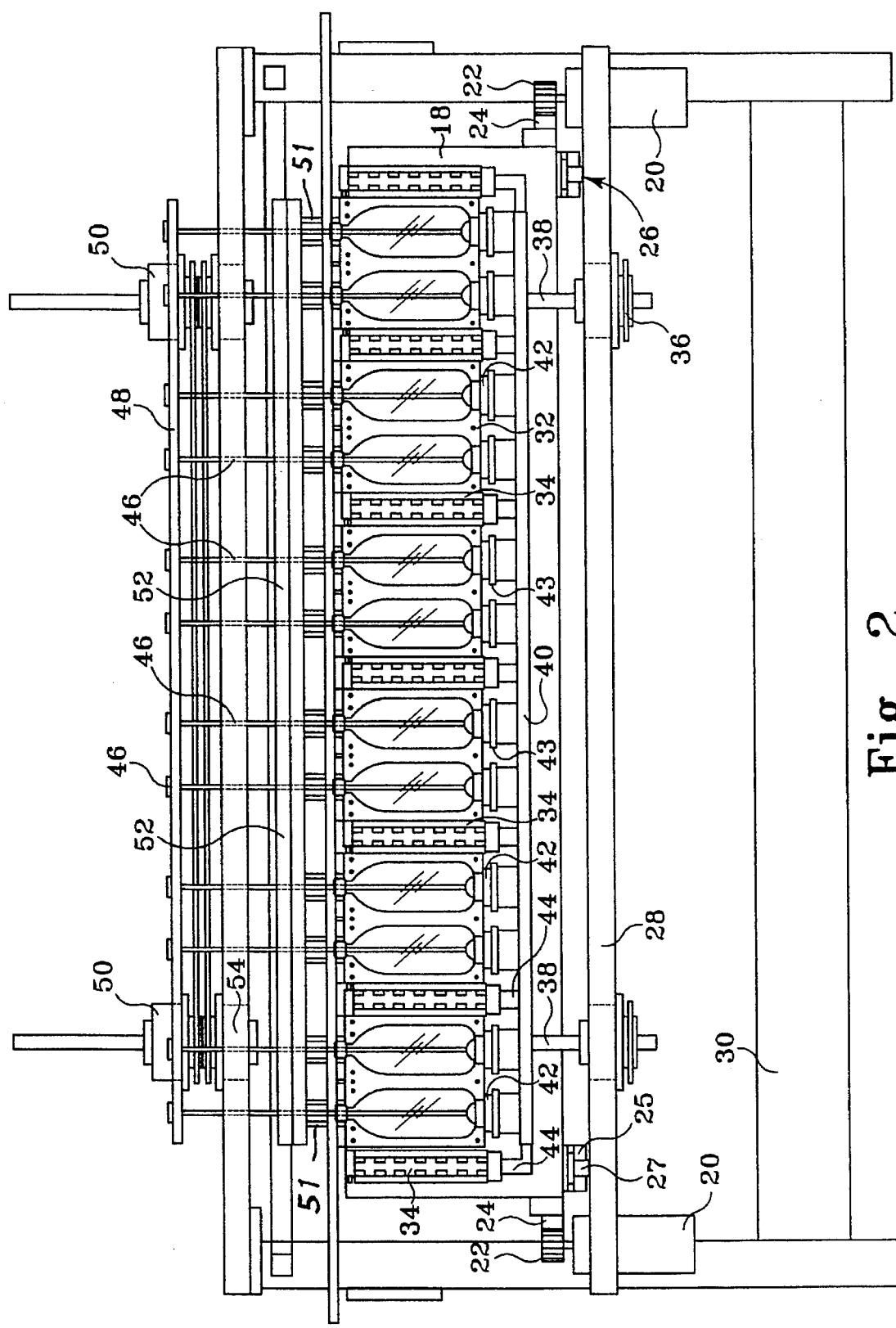
FIG. 2 is a sectional elevational view taken along line 2—2 of FIG. 1, including the stretch rod assembly.

Guide means 26 in the form of runners 25 are attached to the bottom of carriage 18 as shown in FIG. 2 to guide the movement of the carriages 16 and 18 along linear paths between the open and closed positions. The runners 25 engage tracks 27 which are fixed to the top surface of support 28 attached to the base frame 30 of the apparatus. The support 28 also supports push-up drive means 36 in the form of servo-drives acting on rods 38 which are fixed to the bottom of a third carriage 40. The third carriage or push-up plate 40 supports bottom molds 42 which cooperate with the confronting mold sets 32 coupled to carriages 16 and 18 to define the mold cavity in which bottles are blown. The third carriage reciprocates vertically while carriages 16 and 18 reciprocate horizontally thereby resulting in an orthogonal relative motion. The bottom molds 42 can be configured to include flanges 43 which can be trapped by the mold sets 32 as the carriages 16 and 18 approach the closed position.

The push-up plate 40 also supports a plurality of lock actuators 44 which act on locks 34 to lock the confronting mold halves carried by carriages 16 and 18 together when the push-up plate 40 is situated in the uppermost position. As the push-up drive system 36 lowers the push-up plate 40, the lock actuators 44 move the locks 34 to an unlocked position. The lock actuators 44 can comprise air cylinders which are actuated after the carriages 16 and 18 assume the closed position. The lock actuators 44 can be situated on carriage 18 rather than on push-up plate 40.

Each of the molds is equipped with a stretch rod 46 having a lower end which can be extended downward into the mold cavity as shown in FIG. 2. Each stretch rod 46 has an upper end fixed to activator plate 48. The activator plate is reciprocated vertically by means of stretch rod drive means 50 illustrated as a servo-drive, but which could be in the form of an air cylinder or other conventional drive known in the art. The movement of the stretch rods 46 is coordinated with the movement of the blowing air nozzles 51 coupled to blow plate 52 by blow plate drive means 54.

Figure 4:
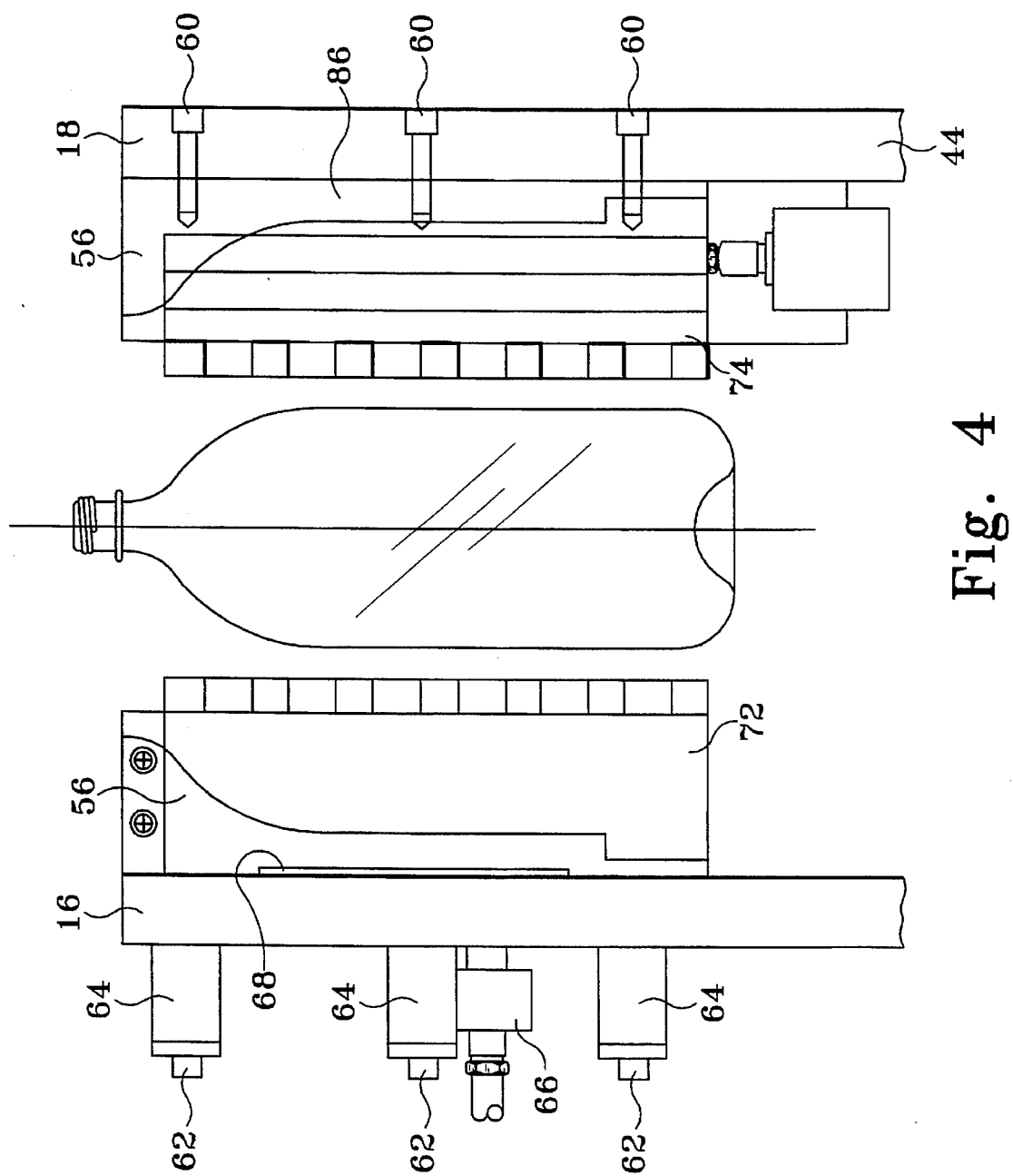
FIG. 4 is a side elevational view taken from the right side of FIG. 3.

A more detailed picture of the blow mold and the clamp assembly can be gained by consideration of FIGS. 3 and 4 where the first carriage 16 is shown to be carrying a first mold half 56 while the second carriage 18 carries a second mold half 58 which confronts mold half 56. Mold half 58 is fixed to carriage 18 by fasteners 60. Mold half 56 is secured to carriage 16 by fasteners 62 which include a biasing spring 64, formed for example by belleville spring washers, which act to bias mold half 56 toward carriage 16 and away from the mating mold half 58.

Figure 9:
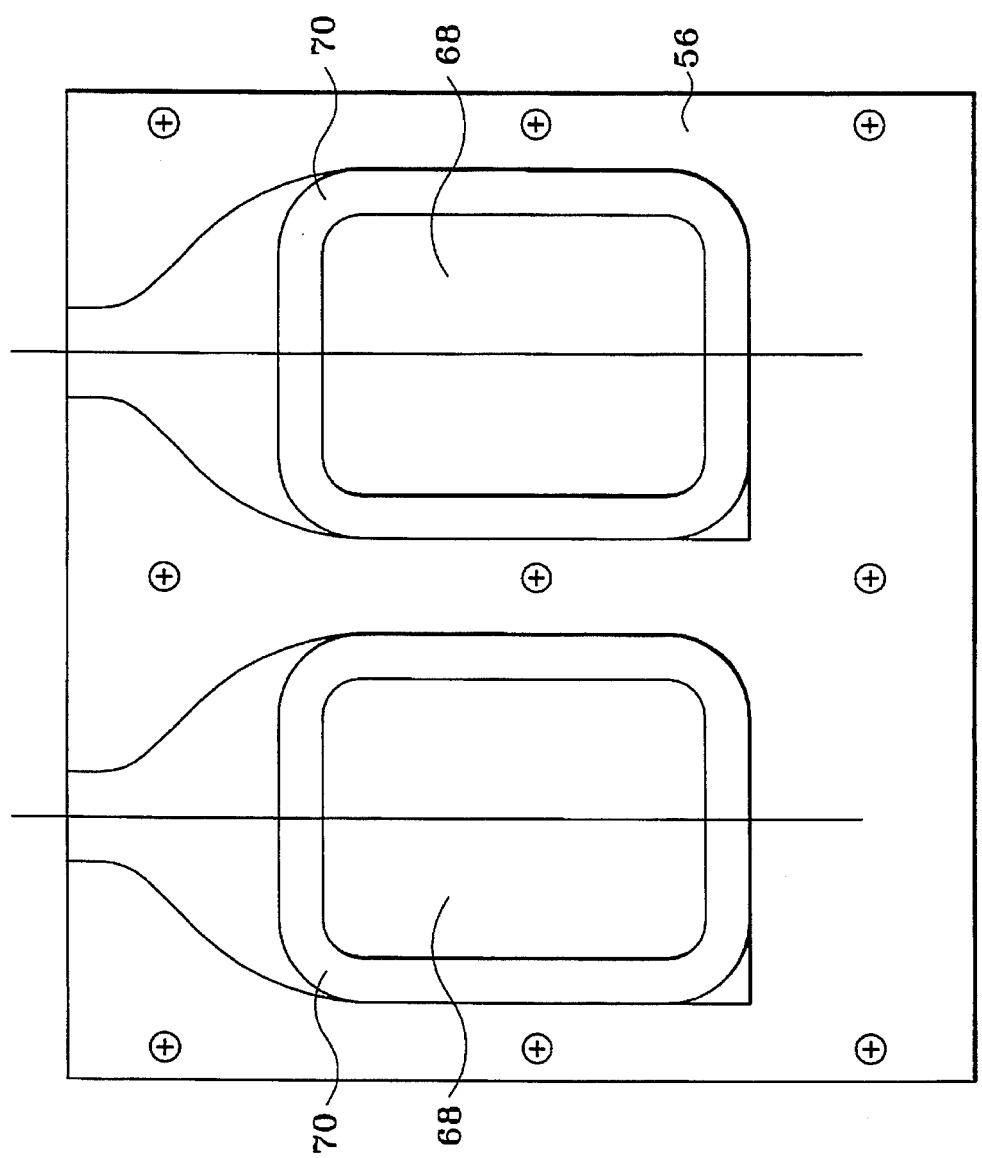
FIG. 9 is a rear elevation view of a blow mold as shown in FIG. 4 separated from the first carriage to show the fluid receiving chamber and O-ring channel.

The mold half 56 can be moved toward mold half 58 and away from carriage 16 against the biasing force of the spring bias 64 by introducing compressed air through inlets 66 which lead to a chamber 68 located on the back surface of the first mold 56 as shown best in FIG. 9. Each of the chambers 68 is defined by a perimetral channel 70 adapted to receive an O-ring for sealing the chamber 58 against the front surface of carriage 16. The O-rings (not shown) are standard in configuration and are sufficiently flexible such that the movement of the mold 56 relative to the carriage 16 up to several millimeters is insufficient to break the seal defined by the O-rings.

Figure 5:
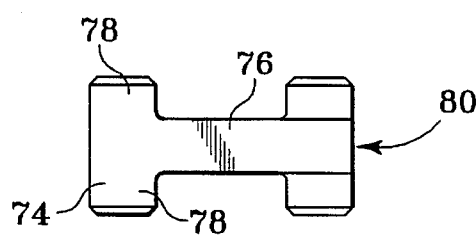
FIG. 5 is a top plan view of a sliding key for use in connection with the present invention.
Figure 7:
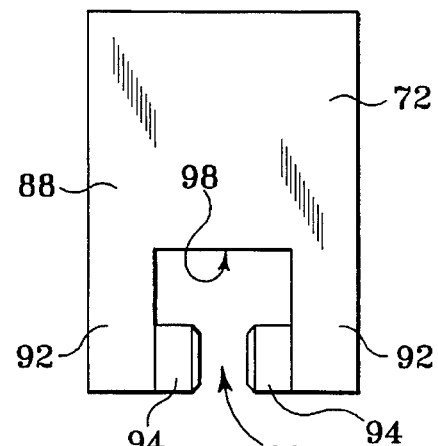
FIG. 7 is a top elevation view of a lock block adapted to receive the key of FIG. 5.
Figure 6:
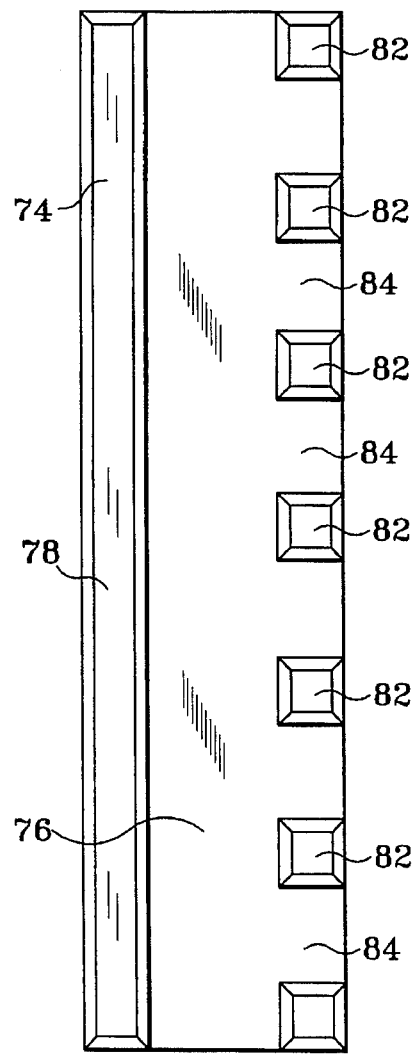
FIG. 6 is a side elevation view of the sliding key shown in FIG. 5.

The lock means 34 which locks the carriages together when the carriages are located in the closed position as shown in FIG. 3 comprises a lock bar 72 fixed to carriage 16 on either side of the mold half 56. The lock bar 72 cooperates with a vertically sliding key 74 situated on each side of mold half 58 secured to the second carriage 18. The key 74 is shown in FIGS. 5 and 6 to comprise an elongated web 76 having a flange 78 extending on both sides along a proximal edge of the web 76. On both sides of the distal edge 80 of web 76 are a series of teeth 82 separated by interdental spaces 84. The flange 78 is captured in a slotted fixture 86 which allows for vertical movement of the key 74 by virtue of the contact of a lower end of the key 74 by actuator 44 as discussed in connection with FIG. 2.

Figure 8:
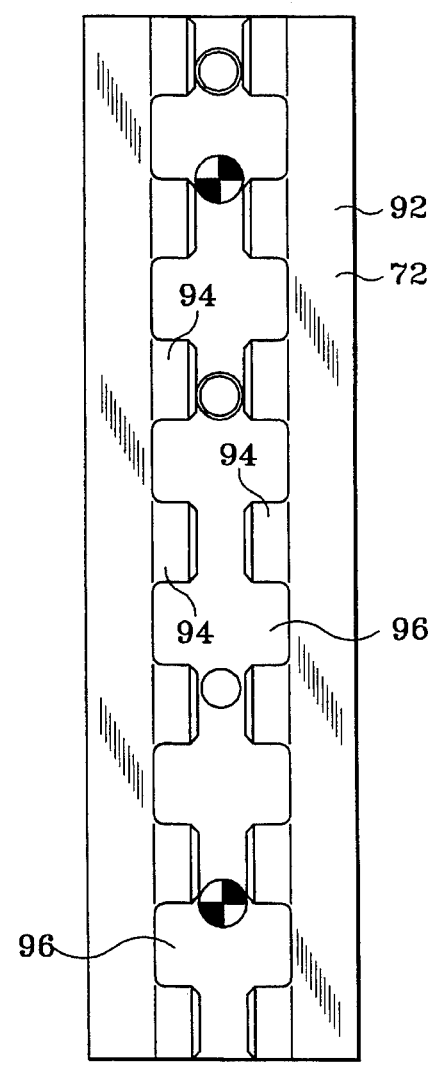
FIG. 8 is a front elevation view of the lock block shown in FIG. 7.

The lock 72 into which key 74 is inserted comprises a block 88 having an open channel 90 for receiving the web 76 of key 74. The channel 90 is defined by channel wall portions 92, each of which have inwardly projecting flange elements 94 which, as seen in FIG. 8, are spaced from each other by spaces 96 sized to receive the teeth 82 of key 74. Upon insertion of the teeth 82 through the openings defined by spaces 96, the distal edge 80 of key 74 approaches the back edge 98 of lock 72 and allows for vertical movement of the teeth 82 within the slot defined between the channel wall portions 92 and behind the flange elements 94. By positioning the teeth 82 directly behind the flange elements 94, the key 74 and lock 72 are locked together so the carriages 16 and 18 cannot separate one from the other. This condition continues until the third carriage or push-up plate 40 is ready to be retracted downward by the push-up drive system 36 when a downward movement of the key 74 is caused to occur by lock actuators 44 to a point permitting the teeth 82 to exit through slots 96.

While the preferred form of an apparatus incorporating applicant's invention has been described above, other variations exist which are within the spirit and scope of the invention as generally described and as claimed in the following claims.

What is claimed is:

1. A blow mold assembly comprising a first and second carriage, motive means for moving at least one of the first and second carriages between an open position and a closed position, guide means for guiding the movement of the at least one carriage along a line of movement between the open and closed positions, at least one first and second mold half coupled respectively to the first and second carriages for movement therewith to define in the closed position at least one blow mold cavity, and mounting means movably mounting said at least one first mold half to the first carriage, the mounting means including biasing means for biasing the first mold half away from the second mold half and displacement means for displacing the first mold half away from the first carriage and toward the second mold half when the carriages are in the closed position to insure continuous mating of the two mold halves defining said at least one blow mold cavity.

2. The blow mold assembly of claim 1 further comprising locking means situated on confronting surfaces of the first and second carriages for locking the carriages together when the carriages are located in said closed position during blow molding of an article within the blow mold cavity.

3. The blow mold assembly of claim 2 further comprising a third carriage carrying at least one bottom mold further defining said at least one blow mold cavity, the third carriage reciprocating orthogonally with respect to the line of movement of both the first and second carriages to and from a central blow molding position.

4. The blow mold assembly of claim 3 wherein the third carriage includes means for actuating said locking means to lock the carriages together at the central blow molding position.

5. The blow mold assembly of claim 4 further comprising biasing means for biasing the locking means toward an unlocked position so that movement of the third carriage away from the central blow molding position will release the locking means to allow separation of the first and second carriages.

6. The blow mold assembly of claim 2 wherein the locking means comprises at lease one channel defining member coupled to one of the first and second carriages having opposed edges including a series of teeth separated by interdental spaces, and at least one cooperating toothed member coupled to the other of the first and second carriages and arranged to penetrate the interdental spaces.

7. The blow mold assembly of claim 6 further comprising a slotted fixture fixed to said other of the first and second carriages for mounting said at least one cooperating toothed members to said other of the carriages, said at least one cooperating toothed member including a flange received in the slotted fixture so that movement of the toothed member from a position aligned with said interdental spaces to a position engaging said teeth can be effected.

8. The blow mold assembly of claim 1 wherein the displacement means comprises a chamber situated between the first carriage and the first mold half, and means for introducing fluid into said chamber in sufficient amount and under sufficient pressure to overcome said biasing means and to resist the pressure applied to the first blow mold half during blow molding of an article within the blow mold cavity.

9. The blow mold assembly of claim 2 further comprising lock actuating means for actuating the lock between a locked and an unlocked position, the lock actuating means being mounted on one of the first and second carriages.

10. The blow mold assembly of claim 1 further comprising at least one blow nozzle assembly including a stretch rod mounted for movement perpendicularly to said line of movement into junction with said at least one blow cavity for stretching a preform within the blow mold cavity while introducing fluid into the preform to form said article.

11. A blow mold assembly comprising a plurality of first and second carriages, motive means for moving the first and second carriages between an open position and a closed positions guide means for guiding the movement of the carriages along a line of movement between the open and closed positions, a set of first mold halves and a set of second mold halves coupled respectively to each of the first and second carriages for movement therewith to define in the closed position a set of blow mold cavities, locking means situated on confronting surfaces of the first and second carriages for locking the carriages together when the carriages are located in said closed position, and mounting means movably mounting each first mold half to one of the first carriages, the mounting means including biasing means for biasing the first mold half away from the second mold half, a chamber situated between the first carriage and the first mold half, and means for introducing fluid into said chamber in sufficient amount and under sufficient pressure to overcome said biasing means and to resist any pressure applied to the first blow mold half during blow molding of an article within the blow mold cavity insuring continuous mating of the two mold halves defining each blow mold cavity.

12. The blow mold assembly of claim 11 further comprising a third carriage carrying at least one bottom mold further defining each blow mold cavity, the third carriage reciprocating orthogonally with respect to the line of movement of both the first and second carriages to and from a central blow molding position, the at least one bottom mold including a flange which is trapped between the first and second carriages when in the closed position.

13. The blow mold assembly of claim 12 further comprising lock actuating means for actuating the locking means between a locked position preventing separation of the first and second carriages and an unlocked position allowing the first and second carriages to separate.

14. The blow mold assembly of claim 11 wherein the locking means comprises a group of channel defining members coupled to one of the first and second carriages having opposed edges including a series of teeth separated by interdental spaces, a group of slotted fixtures fixed to the other of the first and second carriages to confront the group of channel defining members, and a group of cooperating toothed members, each cooperating toothed member including a web having a flange received in one of said slotted fixtures and arranged to penetrate the interdental spaces, the slotted fixtures permitting movement of the toothed members from a position aligned with said interdental spaces to a position engaging said teeth.

15. A blow mold assembly comprising at least one set of confronting carriages, said at least one set comprising a first carriage and a second carriage, motive means for moving the first and second carriages linearly between an open position and a closed position, guide means for guiding the movement of the confronting carriages along a linear path between the open and closed positions, at least one first and second mold half coupled to each of the first and second carriages respectively for movement therewith to define in the closed position at least one blow mold cavity for said at least one set of carriages, and a channel defining member coupled to one of the first and second carriages of said at least one set of carriages, the channel defining member having opposed edges including a series of teeth separated by interdental spaces, a slotted fixture fixed to the other of the first and second carriages, and a cooperating toothed member arranged to penetrate the interdental spaces of the opposed edges of the channel defining member, the cooperating toothed member including a web having a flange received in said slotted fixture for mounting said cooperating toothed member to permit movement of the toothed member from a position aligned with said interdental spaces to a position engaging said series of teeth for locking the carriages together when the carriages are located in said closed position.

16. The blow mold assembly of claim 15 wherein said at least one set of confronting carriages further comprises a third carriage carrying at least one bottom mold further defining said at least one blow mold cavity, each third carriage reciprocating orthogonally with respect to said linear path of said first and second carriages to and from said closed position, each third carriage including means for actuating said locking means to lock the first and second carriages together at the closed position.

17. The blow mold assembly of claim 15 wherein said at least one of confronting carriages further comprises mounting means movably mounting each first mold half, each mounting means including biasing means for biasing the first mold half away from the second mold half, a chamber situated between each first carriage and associated first mold half, and means for introducing compressed air into said chamber in sufficient amount and under sufficient pressure to overcome said biasing means and to resist any pressure applied to the first blow mold half during blow molding of an article within the blow mold cavity insuring continuous mating of the two mold halves defining said at least one blow mold cavity.

18. The blow mold assembly of claim 15 further comprising a blow nozzle assembly including a stretch rod for stretching a preform within said at least one blow mold cavity while introducing fluid into the preform to form each article, and means for coordinating the movement of the blow nozzles and stretch rods of the assembly.

* * * * *